Oct. 23, 1956     W. J. KING     2,767,824

CONVEYOR BELT

Filed April 23, 1951

Inventor
W. J. King
By
Attorneys

United States Patent Office 2,767,824
Patented Oct. 23, 1956

2,767,824

CONVEYOR BELT

William James King, Hayes, England, assignor to Electric & Musical Industries Limited, Hayes, England, a company of Great Britain Application April 23, 1951, Serial No. 222,463

Claims priority, application Great Britain April 28, 1950

5 Claims. (Cl. 198—131)

This invention relates to conveyors, and to conveyor belts for use therein.

It has previously been proposed to provide apparatus for settling fluorescent material and thin films on the end walls of cathode ray tubes, with the object of producing fluorescent screens thereon, the apparatus including a conveyor having an endless belt to which trolleys are attached at intervals, the trolleys each carrying a pneumatic or other chuck in which a cathode ray tube envelope can be secured. In operation of the apparatus, phosphor suspension and filming solution are dispensed to the tubes in turn as they advance along the upper run of the conveyor belt, the tubes being secured in the chucks so as to be upright when on the upper run of the belt. It is highly important that the movement of the tubes secured to the trolleys should be smooth and free from vibration. However, with conveyor belts of conventional construction and of the length required it is found that an intermittent vibration, mainly of low frequency, is prone to arise in the belt at the slow speeds which are necessary, the speed of the conveyor belt being for example of the order of 1 foot per minute. Such vibration, when it arises, vitiates the settling operations carried out with the air of the apparatus.

A similar difficulty may arise in other conveyors, and especially in slow speed conveyors, and the object of the present invention is to reduce the difficulty referred to.

According to the present invention there is provided a conveyor comprising endless guides defining an endless path including an upper run and a lower run, trolleys supported by said guides for movement round said path, said trolleys having rollers engaging said guides, an endless conveyor belt comprising at least one flexible, substantially inextensible band of strip metal longitudinally coextensive with said path and having said trolleys attached in succession to it, terminal drums having their circumferential surfaces frictionally engaged by said belt, and means for rotating one of said drums to impart longitudinal movement to said belt to move said trolleys round said path, each article holder including means for retaining a cathode ray tube with the article holder inverted on the lower run of the guideway.

In order that the said invention may be clearly understood and readily carried into effect, the same will now be more fully described with reference to the accompanying drawings, in which.

Figure 1:
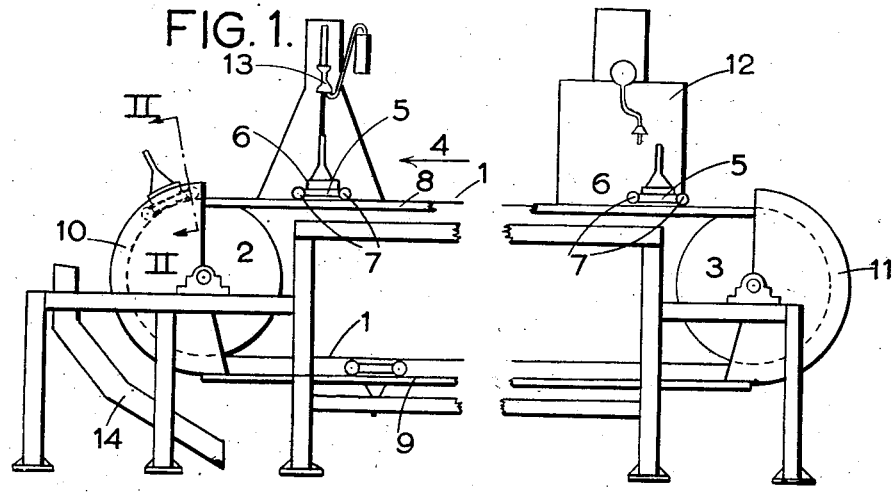
Figure 1 illustrates diagrammatically a conveyor for settling material on to the end wall of cathode ray tube envelopes.
Figure 2:
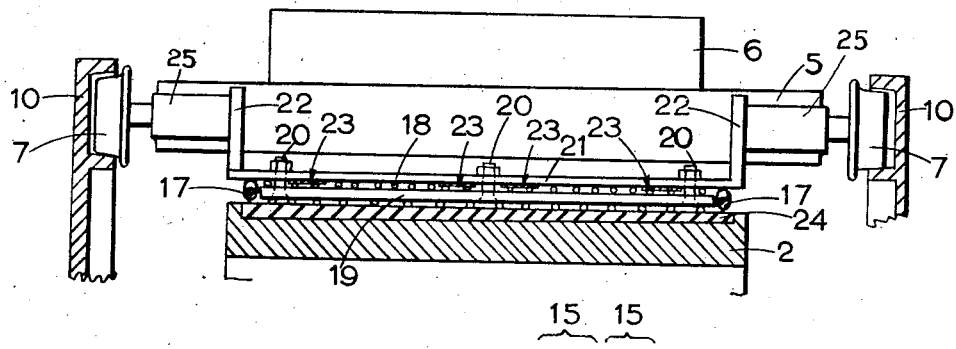
Figure 2 is a part sectional view on the line II—II of Figure 1 illustrating the construction of the conveyor.

Referring to the drawings, the conveyor comprises an endless belt 1 which extends between two terminal metal drums 2 and 3, the drum 2 being arranged to be driven by means, not shown, so that the upper run of the belt is advanced in the direction of the arrow 4. A plurality of trolleys 5, only four of which are indicated in the drawing, are secured at intervals to the belt 1. Each trolley supports a chuck, or tube holder 6, adapted to hold a cathode ray tube envelope by engaging the screen end thereof. The trolleys 5 are secured to the belt 1 in a manner which will be described subsequently and each trolley has four bearings in which flanged rollers 7 are journaled. One trolley is indicated in Figure 2 and two of the bearings 25 for this trolley are shown. The flanged rollers run on rails 8 and 9 co-extensive respectively with the upper and lower runs of the conveyor belt. Moreover, channel-shaped guides 10 and 11 are provided at the side of the drums 2 and 3 to receive the roller 7 as the carriages 5 pass round said drums.

Parts of the guides 10 and the drum 2 are shown in section in Figure 2. The rails 8 and 9 and the guides 10 and 11 provide a fixed endless guideway including an upper run and a lower run and the trolleys are supported by the guideway for movement round the path defined by the guideway, that is to say, even if the conveyor belt 1 were absent the trolleys could be moved round the path defined by the guideway without falling off since they are supported by the guideway at all positions round the path. Dispensing apparatus 12, for dispensing measured quantities of phosphor suspension, is provided at the beginning of the upper run of the conveyor and near the end of the upper run a pipette 13 is provided for dispensing filming solution. The overall length of the conveyor belt may be, for example, 120 feet, and the width 15 inches, and the belt may be driven by the drum 2 at a speed of 1 foot per minute.

In operation, cathode ray tube envelopes are loaded on to the trolleys 5 in the vicinity of the drum 3 and as the envelopes pass the apparatus 12 an operator dispenses to each envelope a measured quantity of phosphor suspension. While each tube advances between the dispensing apparatus 12 and the pipette 13 the phosphor settles from the suspension in known manner on to the end wall of the cathode ray tube to form a fluorescent screen thereon. As the tube envelopes approach the end of the upper run another operator dispenses to each envelope a measured quantity of filming solution by means of the pipette 13. Between the pipette 13 and the drum 2 the solvent of the filming solution evaporates whilst the filming ingredient forms a thin film on the upper surface of the liquid dispensed by the apparatus 12 and which originally contained the phosphor. As each trolley passes round the drum 2, the trolley and the cathode ray tube envelope retained therein is inverted, said liquid is decanted slowly into a drain 14 and during this operation the thin film settles in a stretched condition over the phosphor particles on the end wall of the envelope. As the envelopes pass along the lower run of the guideway, the interior of each envelope is dried and the envelopes, now provided with a fluorescent screen, are removed from the trolleys 5 as the latter pass round the drum 3.

Figure 3:
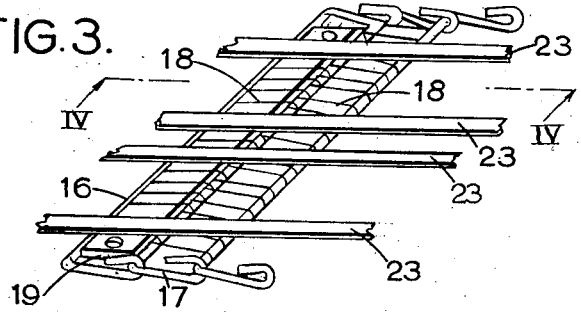
Figure 3 is a perspective view of a small part of the conveyor belt.
Figure 4:
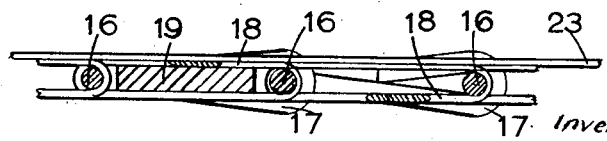
Figure 4 is a detail sectional view on a relatively enlarged scale taken on the line IV—IV of Figure 3.

As shown in Figures 2 and 3, the conveyor belt comprises an endless web formed of linked wire elements 15 each of which is in the form of a transverse limb 16 having hook-like side limbs 17 at the ends of the transverse limb 16. The elements are linked together by hooking the limbs 17 of each element around the transverse limb of the succeeding element. The transverse limbs are further linked together by wire helices 18, a helix being wound round each pair of successive transverse limbs 16 in such a manner that the helix round one pair of limbs is interlaced with the helix wound round the next pair of limbs as shown in Figure 3. Securing bars 19 are disposed at intervals round the web, one such bar being shown in each of Figures 2 and 3. Each bar is disposed between the transverse limbs 16 of two successive linked elements 15 so that the bar is enclosed by the respective helix 18. There is one securing bar 19 for each trolley 5 and each trolley is secured to the web by means of bolts 20 whose heads are counter-sunk in the respective securing bar 19 and which project to the outer surface of the web where they pass through a transverse member 21 (Figure 2) aligned with the securing bar but disposed on the upper side of the linked elements 15 and helices 18. Brackets 22 are welded as shown in Figure 2 to the ends of each transverse member 21 and the bearings 24 for the leading pair of rollers 7 of the respective trolley are attached to these brackets, the trolley being not attached to the web otherwise than by means of the brackets 22 so as to permit relative movement between belt and trolley as the belt passes round the drums 2 and 3. Furthermore four parallel bands of spring steel 23 extend wholly round the outer surface of the web, the steel bands passing between the securing bars 19 and the transverse members 21 so that they are clamped firmly in position between these parts by the bolts 20. In securing the steel bands 23 in position the web is contracted to just such an extent that after the bands 23 have been secured in position all driving tension is taken by the bands. Substantially no extension of the conveyor belt due to play of the linked elements 15 is then possible, because of the substantially inextensible nature of the steel bands 23. In operation of the apparatus the drive is transmitted to the belt 1 by frictional engagement between the drum 2 and the linked elements 15 since it will be understood that with the construction described the linked elements 15 and the wire helices 18 engage directly with the circumferential surface of the drums, the drum 2 having a rubber covering 24 (Figure 2) to ensure adequate driving friction between this drum and the conveyor belt. The principal function of the linked elements 15 in the conveyor belt 1 is to facilitate the attachment of the trolleys to the steel bands 23, attachment directly to steel bands being difficult to achieve. The linked elements are, moreover, advantageous from the point of view of transmitting the drive to the belt.

It has been found that a suitable steel for the bands 23 is so-called "main spring steel" such as used for clockwork gramophone springs. Such a steel is a hardened tempered steel whose breaking tensile stress is 113 tons and whose hardness, by the diamond pyramid test is 525±20. The bands may be from 0.022 to 0.025 inch thick and in the example illustrated in which four bands are used are each about 1 inch wide. By the use of the bands, any liability for low frequency vibration or jerkiness in the longitudinal movement of the trolleys 5 is substantially eliminated, while any high frequency vibration of the belt, originating from the driving unit, is also substantially reduced. In this way despite the continuous motion of the belt the settling of the phosphor material and the film on the end wall of the cathode ray tube can be satisfactorily performed.

The details of the belt construction may of course be modified to suit different requirements, for example the spring steel bands 23 may be wider in which case the number of bands may be reduced. For example, three bands may be employed instead of four as illustrated and the bands in this case may be about 4½ inches wide. Moreover, the bands may be suitably apertured and disposed between the parts 19 and 21 so that the bolts 20 pass through the apertures.

Moreover, it will be appreciated that the invention is not confined to conveyors adapted for use in the process of settling materials on to the walls of cathode ray tube envelopes and may be applied to other conveyors and especially slow speed conveyors in which freedom from low frequency vibration is important. The invention may, moreover, be applicable to conveyors employing belts of canvas, leather or like material which can stretch when subjected to driving tension.

What I claim is:

1. A conveyor comprising rotatable drums, means for imparting rotation to one at least of said drums, an endless conveyor belt extending between and around said drums, said belt comprising successive metal link elements each having a transverse limb and a side limb hooked round an adjacent link element, wire-wound helices each embracing the transverse limb of two adjacent elements, said link elements and helices forming a flexible web, said web being extensible due to play of the link elements, securing bars disposed transversely of said web each enclosed by one of said helices, and at least one substantially inextensible metal band secured to said bars to prevent extension of said web due to play of the links.

2. A conveyor according to claim 1, comprising cathode ray tube envelope holders secured to said securing bars, and support means to prevent sagging of the belt.

3. A conveyor belt comprising successive metal link elements each having a transverse limb and side limb linked to an adjacent link element, wire-wound helices each embracing the transverse limb of two adjacent elements to form with said elements a flexible web extensible due to play of the linked elements, securing bars disposed transversely of said web each enclosed by one of said helices, and at least one substantially inextensible steel band secured to said securing bars to prevent extension of said web.

4. A conveyor comprising endless guides defining an endless path including an upper run and a lower run, trolleys supported by said guides for movement round said path, said trolleys having rollers engaging said guides, an endless conveyor belt comprising at least one flexible, substantially inextensible band of strip metal longitudinally co-extensive with said path and having said trolleys attached in succession to it, terminal drums having their circumferential surfaces frictionally engaged by said belt, and means for rotating one of said drums to impart longitudinal movement to said belt to move said trolleys round said path, each article holder including means for retaining a cathode ray tube with the article holder inverted on the lower run of the guideway.

5. A conveyor comprising a fixed endless guideway having an upper run and a lower run, article holders supported by said guideway for movement round the path defined by said guideway, an endless belt of linked metal elements co-extensive with said path, terminal drums having their circumferential surfaces frictionally engaged by said belt, at least one flexible substantially inextensible band of strip metal longitudinally co-extensive with and attached to said belt, said article holders being attached to said band, means for rotating one of said drums to impart longitudinal movement to said belt to move said article holders round said path, each article holder including means for retaining a cathode ray tube with the article holder inverted on the lower run of the guideway.

References Cited in the file of this patent

UNITED STATES PATENTS

| 779,981 | White | Jan. 10, 1905 |
| 1,078,528 | Allsop | Nov. 11, 1913 |
| 1,110,990 | Provandie | Sept. 15, 1914 |
| 1,764,791 | Ingle | June 17, 1930 |
| 1,812,390 | Wetmore | June 30, 1931 |
| 1,887,425 | Pink | Nov. 8, 1932 |
| 2,076,506 | Sibson et al. | Apr. 6, 1937 |
| 2,356,540 | Schwinn | Aug. 22, 1944 |
| 2,572,172 | McCusker | Oct. 23, 1951 |
| 2,623,746 | Gegenheimer et al. | Dec. 30, 1952 |
| 2,646,769 | Lindsay | July 28, 1953 |
| 2,646,773 | Burton | July 28, 1953 |